(12) United States Patent
Berthou et al.

(10) Patent No.: US 11,365,757 B2
(45) Date of Patent: Jun. 21, 2022

(54) FASTENER WITH LUBRICATING RING FOR INTERFERENCE FITTING, AND ASSEMBLY METHOD USING SUCH A FASTENER

(71) Applicant: LISI AEROSPACE, Paris (FR)

(72) Inventors: Alexandre Berthou, Bois-Colombes (FR); Florent Verdier, Rueil Malmaison (FR); Charles Pham, Sevran (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 16/273,558

(22) Filed: Feb. 12, 2019

(65) Prior Publication Data

US 2019/0195268 A1    Jun. 27, 2019

Related U.S. Application Data (63) Continuation-in-part of application No. PCT/IB2018/000180, filed on Feb. 7, 2018, and a
(Continued)

(30) Foreign Application Priority Data

Aug. 12, 2016    (FR) ...................................... 1657749

(51) Int. Cl.
  *F16B 33/06*    (2006.01)
  *F16B 19/05*    (2006.01)
(52) U.S. Cl.
  CPC .............. *F16B 33/06* (2013.01); *F16B 19/05* (2013.01)
(58) Field of Classification Search
  CPC .................................. F16B 33/06; F16B 19/05
  See application file for complete search history.

(56) References Cited

U.S. PATENT DOCUMENTS

| 3,390,906 A | 7/1968 | Wing |
| 3,512,446 A | 5/1970 | Sekhon |

(Continued)

FOREIGN PATENT DOCUMENTS

| CN | 204572681 U | 8/2015 |
| EP | 2406336 | 5/2013 |

(Continued)

OTHER PUBLICATIONS

Poll, Andreas, International Search Report, dated Nov. 29, 2017, 3 pages, WIPO, European Patent Office, Netherlands.

(Continued)

*Primary Examiner* — Ryan J. Walters
(74) *Attorney, Agent, or Firm* — Henricks Slavin LLP (57) ABSTRACT

A fastener for assembling at least two structural elements having an aperture, may have a fastener comprising an enlarged head (12) and a shank (14) exhibiting, prior to fitting, an outside diameter ($D_1$) greater than an inside diameter ($D_S$) of the aperture, and a locking portion comprising a screw thread or annular grooves. The fastener further comprises a lubricating sacrificial ring (40) on the exterior surface of the fastener, extending at least between a distal end of the shank and a proximal end of the locking portion, said ring having, before the fastener is fitted into the structure, an outside diameter greater than a diameter of the aperture. The sacrificial ring comprises a polymer resin forming a matrix encapsulating dispersant molecules and oil molecules.

The fastener assembly may apply to the assembly of aircraft structures.

25 Claims, 6 Drawing Sheets

Related U.S. Application Data continuation-in-part of application No. PCT/FR2018/050305, filed on Feb. 7, 2018, and a continuation-in-part of application No. PCT/EP2017/070591, filed on Aug. 14, 2017.

(56) References Cited

U.S. PATENT DOCUMENTS

| | | | |
|---|---|---|---|
| 3,779,127 | A | 12/1973 | Speakman |
| 3,962,775 | A | 6/1976 | King, Jr. |
| 3,979,351 | A | 9/1976 | Sekhon |
| 4,081,012 | A | 3/1978 | Wallace |
| RE30,445 | E | 12/1980 | Ruhl |
| 4,326,825 | A | 4/1982 | Volkmann et al. |
| 5,098,238 | A | 3/1992 | Batchelor et al. |
| 6,665,922 | B2 | 12/2003 | Schultz |
| 6,702,684 | B2 | 3/2004 | Harbin et al. |
| 7,275,903 | B2 | 10/2007 | Schultz |
| 2005/0059782 | A1 | 3/2005 | Andrist |
| 2010/0034615 | A1* | 2/2010 | Mori .......... C10M 173/02 411/387.4 |
| 2017/0298970 | A1 | 10/2017 | Bourges |

FOREIGN PATENT DOCUMENTS

| | | |
|---|---|---|
| EP | 2876314 | 5/2015 |
| FR | 2946707 | 12/2010 |
| FR | 3008754 | 1/2015 |
| FR | 3026446 | 4/2016 |
| GB | 2119467 | 11/1983 |
| WO | WO 2010/142901 | 12/2010 |
| WO | WO 2016/050791 | 4/2016 |
| WO | WO 2018/029381 | 2/2018 |

OTHER PUBLICATIONS

Poll, Andreas, Written Opinion, dated Nov. 29, 2017, 6 pages, WIPO, European Patent Office, Munich.

Bertrand, Samuel, International Search Report, dated Oct. 26, 2018, 5 pages, European Patent Office, Rijswijk, Netherlands.

Bertrand, Samuel, Written Opinion of the International Searching Authority, dated Oct. 26, 2018, 6 pages, European Patent Office, Munich, Germany.

* cited by examiner

FASTENER WITH LUBRICATING RING FOR INTERFERENCE FITTING, AND ASSEMBLY METHOD USING SUCH A FASTENER

CROSS REFERENCE TO RELATED APPLICATIONS

This is a continuation-in-part of International Application PCT/EP2017/070591, filed Aug. 14, 2017, which claims priority to FR 1,657,749, filed Aug. 12, 2016, and also is a continuation-in-part of International Application PCT/IB2018/000180, filed Feb. 7, 2018, which is a conversion of International Application PCT/FR2018/050305, filed Feb. 7, 2018, the contents of all of which are incorporated herein by reference.

BACKGROUND

The present invention relates to a fastener intended to be interference-fitted into an aperture of an aircraft structure and to a method for fitting such a fastener in an assembly of structures.

Certain aircraft structures are highly stressed in shear loading, and experience highly variable loading cycles, these typically being the structures of the wings or the joints between wing structures and fuselage. In order to assemble these structures use is made of interference-fitted fasteners, which means to say fasteners fitted with a negative clearance between the shank of the fastener and the aperture in the structure intended to accept the fastener. In other words, the outside diameter of the fastener is greater than the diameter of the aperture before the fastener is fitted. This method of interference-fitting fasteners makes it possible to improve the strength of the structure, notably its ability to withstand cyclic loadings.

Interference-fitted fasteners currently in use are of the pull type or of the push type. A third type of fasteners referred to as sleeved or sleeve fasteners allows an interference to be created in the structure without having friction against the latter during the fitting phase.

Pull-type fasteners comprise an enlarged head intended to rest against one face of the structure, referred to as the "front" face, or in a countersink formed in this face, a shank, a locking portion in the form of a screw thread or of crimping grooves, and a pulling stem comprising pulling grooves. The fastener is dimensioned so that the pulling stem protrudes from the opposite face of the structure—referred to as the "rear" face. These grooves are gripped by a tool which pulls on the pulling stem and inserts the fastener until the head comes up against the front face of the structure. The stem is then broken or removed. These fasteners are typically the GP™, LGP™ or XPL™ lockbolts by HUCK Manufacturing, or the PULL-IN™ or PULL-STEM™ fasteners by LISI AEROSPACE. These fasteners are for example described in patents U.S. Pat. Nos. RE30445, 6,702,684, 5,098,238 or 6,665,922.

Push-fit fasteners are made up of the same elements as pull-fit fasteners except for the pulling stem. They are interference-fitted in the structure by pushing them in using a hammer, a hammer gun, or a ram if it is possible to position the structure in an assembly jig. These fasteners are typically HI-LITE™ fasteners described in patent U.S. Pat. No. 4,326,825.

Sleeved fasteners are provided which a sleeve which accepts the shank of the fastener, and can be installed by pushing, by pulling or even by screwing. In this case, the fastener is kept rotationally fixed and a nut is screwed on to the threaded end. The turning of the nut forces the body of the screw, which is slightly tapered, into the sleeve which is held axially on the structure by its head, so that the sleeve expands radially in the structure. Such a fastener is described for example in patent application WO 2010/142901.

In order to protect the contacting parts from galvanic corrosion and in order to avoid any seizure between the thread of the screw and the tapping of a nut or alternatively between the shank and the structure during interference fits, the fasteners may also be covered with an organic coating containing aluminum pigment, typically from five to thirteen microns thick, of the HI-KOTE™ type, which has been developed and marketed by the company HI-SHEAR Corporation, and which are described for example in patents U.S. Pat. No. 3,979,351 and EP 2 406 336 B1. These coatings have a certain lubricating ability, reducing the loads of installing the fastener during the fitting into the structure or into the sleeve in the case of a sleeved fastener.

Aeronautical fasteners are generally lubricated using cetyl alcohol applied to the entire exterior surface of the fastener. Cetyl alcohol is a fatty alcohol with the semi-developed formula $CH_3(CH_2)_{15}-OH$. At ambient temperature, cetyl alcohol adopts the form of a waxy white solid or of flakes. In order to be able to be applied to the fastener, the flakes are diluted in a solvent and the fastener is dipped in the solution. Once the solvent has evaporated, the solid flakes of cetyl alcohol cover the fastener.

Figure 1:
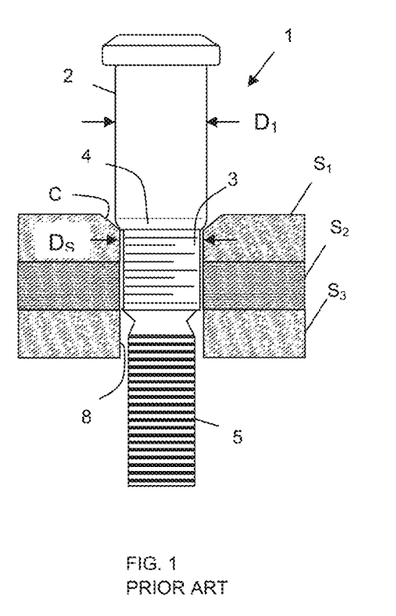
FIGS. 1 and 2: already described, a fastener of the prior art respectively before insertion into a structure and during an insertion phase.

FIG. 1 schematically depicts an insertable fastener of the prior art, during the course of being interference-fitted into a structure S featured in cross section, comprising a aperture 8 of diameter $D_S$. The fastener 1 comprises a protruding head, a cylindrical shank 2 of outside diameter $D_1$ greater than $D_S$, and a threaded end 3 the maximum diameter of which is smaller than the diameter $D_1$ of the cylindrical shank and smaller than the diameter of the aperture Ds. A transition zone 4 connects the shank 2 and the threaded end 3. The transition zone may have various geometries, such as one or more radii, or even an angle. The fastener here comprises a pulling stem 5 equipped with pulling grooves. The fastener is entirely coated with an anticorrosion organic coating of the HI-KOTE™ 1 type.

Figure 2:
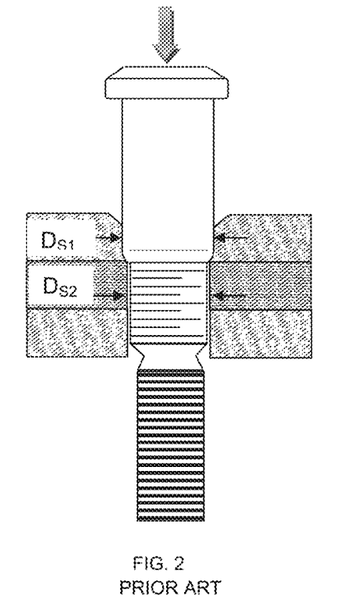

In FIG. 2 the fastener of FIG. 1 is partially engaged in the structure, creating interference.

As depicted in FIGS. 1 and 2, in which the relative differences in size have been exaggerated for the sake of greater clarity, a chamfer or a radius is generally made on the entry to the aperture of the first layer S1 of the structure, so as to accommodate the radius under the head of the fastener. This chamfer does not exist on the other layers S2 and S3 in the middle of the assembly when the drilling is made through all the layers. During the transition from one layer of structure to the next, a geometric staircase effect arises because the aperture of the first layer is expanded radially by the fastener shank already inserted, whereas the diameter of the aperture of the next layer is smaller.

The applicant company has discovered that the staircase effect accentuates the fitting force when the fastener 1 enters a layer comprising a material that is more rigid than the material of the layer previously passed through, for example when the fastener passes from a layer of composite material to a layer made of metal, for example titanium, aluminum or steel, or when the fastener passes through a first layer made of aluminum followed by a layer made of steel.

The staircase effect is weakly accentuated when the fastener enters a layer comprising a material that is not as rigid as the material of the layer previously passed through, for example when the fastener passes from a layer made of metal into a layer made of composite.

Figure 3:
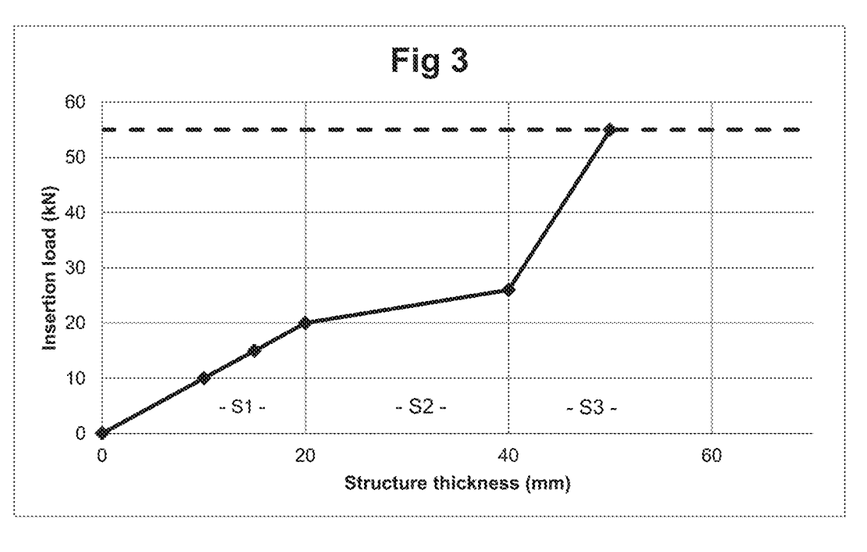
FIG. 3: already described, a curve of the force of interference fitting a fastener of the prior art into a pre-drilled structure.

The staircase effect is depicted in FIG. 3 which shows a schematic example of the force required to insert a fastener 1 of the prior art interference-fitted into the structure S of FIGS. 1 and 2, in the case of a total structure thickness of 60 mm, made up of three layers S1, S2, S3 respectively made of aluminum, carbon fiber composite and titanium, each layer having a thickness of 20 mm. The fastener in this example is able to withstand a maximum insertion force equal to 56 kN, represented by the dotted horizontal line. What that means to say is that, if a force greater than 56 kN is imparted to the fastener, the pulling stem of the fastener will break. When the fastener 1 enters the first layer S1, the fitting force increases substantially linearly with a first gradient. On entering the second layer S2, the gradient of the fitting force decreases slightly because the composite material of the layer S2 deforms more readily under the imparted force needed to interference fit the fastener into the aluminum.

As the fastener enters the third layer S3, the gradient increases significantly because the layer S3 is made of titanium. The insertion force here reaches the maximum threshold before the shank 2 of the fastener is completely inserted into the entire structure S. The fastener is not fitted all the way in, which means to say that the head of the fastener is not in contact with the front face of the structure S and part of the shank 2 is outside the structure S. To fit the fastener all the way in a fitting force greater than the maximum strength of the fastener would have to be imposed on the fastener and that would cause the fastener to break inside the structure before it has been correctly installed.

The applicant company has observed that the insertion into the first two layers substantially tears away the very fine layer of lubricant and/or of anticorrosion coating on the transition zone 4 and on the shank 2. In effect, the transition zone 4 is the first zone of the fastener to come into contact with the structure S. This zone is the most highly loaded in friction against the structure because during fitting it passes through the entire thickness of the structure. In addition, the transition zone 4 will experience the geometric staircase effects as it passes through the layers which tend to localize the contact forces and lead to rapid deterioration of any coatings there might be or even of its geometry.

When the fastener enters the third layer S3, the rigidity of the titanium, combined with the direct contact between the fastener and the structure lead to a sharp increase in the force needed to insert the fastener as an interference fit into the third layer.

The applicant company has also observed that the apertures made in different materials had different diameters, because of the different conditions in which the materials are cut during the drilling with the one same tool. The difference in diameter may therefore accentuate the geometric staircase effect phenomenon. The staircase effect may also be created when the layers are predrilled and then aligned, and the apertures of the various layers have an alignment defect.

Moreover, the more the thickness of the assembly increases, the more the area for friction between the shank of the fastener and the aperture increases. At high levels of interference, there is therefore increased probability that the fastener will not be inserted all the way in for thick assemblies because of the greater probability of the anti-corrosion and/or lubricating coating being torn off.

Document U.S. Pat. No. 3,779,127A describes a fastener intended to be interference-fitted into an aperture to assemble a structure. The fastener comprises two bulbs of diameters greater than the nominal diameter of the shank of the fastener and which are intended to expand the aperture to a diameter greater than the diameter of the shank. When the fastener previously covered with a lubricant is forcibly introduced into the aperture, the back surface 48 of a bulb 28 allows the aperture wall to smoothly elastically recover into a lubricant reservoir 52, and a quantity of lubricant trapped in the hollow part between the two bulbs is picked up and carried along and eases the progress of the larger-diameter second bulb. With such a solution, the expansion of the aperture beyond the diameter of the shank of the fastener is a necessity that does not apply to all materials and in any event is not necessarily desired.

SUMMARY

It is an object of the invention to overcome these problems. Thus, one subject of the invention is a fastener for assembling at least two structural elements, the fastener comprising an enlarged head and a cylindrical or tapering smooth shank exhibiting, prior to fitting, an outside diameter greater than an inside diameter of a destination aperture, a locking portion comprising a screw thread or annular grooves and exhibiting an outside diameter always smaller than the inside diameter of the destination aperture, and a transition portion between a distal end, with respect to the enlarged head, of said smooth shank and a proximal end, with respect to the enlarged head, of said locking portion.

The fastener furthermore comprises at least one sacrificial ring containing a lubricant, arranged on an exterior surface of the fastener, positioned on an exterior surface of the smooth shank and or of the locking portion and or of the transition portion, said sacrificial ring exhibiting, prior to the fitting of the fastener into the structure, an outside diameter greater than a maximum outside diameter of the locking portion and greater than a smallest diameter of the aperture with which the smooth shank will interfere after the fastener has been fitted, said sacrificial ring exhibits, prior to the fitting of the fastener into the structure, a toroidal shape.

Thus, the sacrificial ring is first to come into contact with the wall of the aperture when the fastener is being interference-fitted into the structure—or into the sleeve if the fastener is interference-fitted into a sleeve—and with each of the layers of the structure which are formed by the structural elements that are to be assembled. The nature of the ring allows to store lubricant and to release the lubricant during insertion when the ring is compressed and worn between the wall of the aperture and the fastener shank surface.

The sacrificial ring corresponds to an additional deposit of material, separate from the structural part of the fastener formed by the head, the smooth shank, the locking portion and, where appropriate, a pulling stem, the ring having a toroidal shape. In the present description "toroidal shape" means a torus with a generatrix cross section that may be but is not necessarily circular in a generalized acceptance of the idea of a torus, the central hole of such torus being the structural part of the fastener passing through it. A reason the cross-section may not be circular is because the interior portion of the ring surface will generally follow the profile of the underlying surface of the fastener. Another reason the cross-section may not be circular is because an exterior portion of the ring surface may form a bead over 360° around the fastener, the bead having a larger cross section in the radial direction than the other part of the ring at the same angle. Another reason the cross-section may not be circular is because the sacrificial ring may include segments separated from an adjacent segment or segments around the fastener at least 50% or greater of the perimeter of the fastener, so that an exterior portion of the ring surface may form a wave over 360° around the fastener. FIGS. 4A to 4E, FIGS. 7 and 8 show rings having a toroidal shape according to the meaning of the present description.

The ring has the ability to wear or erode easily when rubbed in contact with another material. The sacrificial ring guarantees the reliability of the insertion of the fastener during the force-fitting into the structure: the ring will be gouged or eroded or worn by the structure or by the sleeve, thereby, gradually as the fastener is inserted, leaving the lubricating material of the sacrificial ring at the interface between the smooth shank and the structure or the sleeve, and the fastener will experience practically no wear. The term "lubricant" is to be understood as meaning any material or substance which, interposed between two surfaces, reduces the friction or wear between these two surfaces in contact and in relative motion. Thus, the lubricating sacrificial ring wears away or becomes destroyed during insertion, and in so doing lubricates the interior surface of the aperture throughout the insertion.

The fastener according to the invention may also comprise at least one or more of the following features, considered in isolation or in combination where these combinations are technically feasible:
- the lubricant comprises a synthetic or mineral oil containing at least 80% in volume of oil,
- the lubricant comprises a mixture of synthetic or mineral oil and cetyl alcohol,
- the dispersant molecules surround the lubricant molecules,
- the polymer resin comprises acrylic polymer,
- the lubricant comprises a polymer resin forming a matrix encapsulating dispersant molecules and lubricant molecules,
- the sacrificial ring comprises polytetrafluoroethylene,
- the sacrificial ring further comprises graphite and or bronze,
- the sacrificial ring comprises a lubricating polymer,
- the sacrificial ring further comprises dry particles of graphite and or of cetyl alcohol,
- the sacrificial ring comprises a first ring comprising a pasty lubricant covered by a second ring forming a sacrificial solid casing,
- the pasty lubricant comprises cetyl alcohol and an oil,
- the pasty lubricant comprises a grease with an NLGI grade of between 00 and 3, preferably between 00 and 2,
- the grease comprises a mixture of wax and of oil, the wax representing between 20% and 50% by weight of the grease,
- the second ring comprises an acrylic polymer, a silicone or a polysulfide polymer,
- the second ring is a fluidtight film resulting from an application of a liquid sealant, hardened by evaporation in the air,
- the sacrificial ring is discontinuous and exhibits peripheral segments following on from one another to form a segmented ring.
- the sacrificial ring exhibits, prior to the fitting of the fastener into the structure, an outside diameter greater than a largest diameter of the aperture with which the smooth shank will interfere after the fastener has been fitted,
- the sacrificial ring exhibits, after the fastener has been fitted into the structure, an outside diameter smaller than the outside diameter it had prior to fitting,
- the sacrificial ring is sheared or cut into at least two portions after the fastener has been fitted into the structure;
- a sheared or cut portion of the sacrificial ring is positioned between an exterior surface of the structure and a surface of the head of the fastener after the fastener has been fitted into the structure,
- the sacrificial ring is worn during the fitting of the fastener into the structure;
- a circular groove is formed so that it is recessed with respect to the exterior surface of the smooth shank, in the smooth shank or in the region of the transition portion, in which circular groove the sacrificial ring is positioned, the sacrificial ring having a shape that complements the circular groove so as to ensure retention of the sacrificial ring in the circular groove;

Another subject of the invention is a method of assembly implementing a fastener of the invention.

For assembling at least two structural elements comprising a aperture exhibiting, before fitting, an inside diameter, the method comprises the steps of
- supplying a fastener comprising an enlarged head, a smooth shank exhibiting, prior to fitting, an outside diameter greater than the inside diameter of the aperture or than an inside diameter of a sleeve that is to be inserted into said aperture, a locking portion comprising a screw thread or annular grooves exhibiting an outside diameter always smaller than the inside diameter of the destination aperture, and a transition portion between a distal end, with respect to the enlarged head, of said smooth shank and a proximal end, with respect to the enlarged head, of said locking portion, and a lubricating sacrificial ring, arranged on an exterior surface of the fastener, positioned on an exterior surface of the smooth shank and or of the locking portion and or of the transition portion, said ring exhibiting, prior to the fitting of the fastener into the structure, a diameter greater than a maximum outside diameter of the locking portion and greater than a smallest diameter of the aperture or of the sleeve with which the smooth shank will interfere after the fastener has been fitted, said sacrificial ring exhibiting, prior to the fitting of the fastener into the structure, a toroidal shape,
- forcibly fitting the fastener into the aperture or into the sleeve placed in the aperture, during which step the lubricating sacrificial ring is worn through interference with an interior wall of the aperture or of the sleeve, so as to release a lubricating substance between a distal end of the smooth shank and a proximal end of the smooth shank.

Another subject of the invention is a water-based composition for forming a ring of a fastener according to the invention, comprising 20% to 60% by volume of water based resin, 35% to 75% by volume of water insoluble an oil-based lubricant, and 1% to 10% by volume of dispersant.

In other embodiments, the water-based composition may comprise:
- 25% to 50% by volume of water based resin, 45% to 70% by volume of water insoluble an oil-based lubricant, and 4% to 6% by volume of dispersant.
- 10% to 60% by volume of water based resin, 2.5% to 20% by volume of cetyl alcohol, 35% to 70% by volume of water insoluble an oil-based lubricant, and 1% to 10% by volume of dispersant.

25% to 45% by volume of water based resin, 2.5% to 10% by volume of cetyl alcohol, 45% to 70% by volume of water insoluble an oil-based lubricant, and 5% to 10% by volume of dispersant, the water insoluble lubricant comprises at least 80% in weight of oil in the total composition of the water insoluble an oil-based lubricant, the water-based composition has a viscosity between 20 000 and 50 000 Cp, measured with a RVT Brookfield viscometer, with a Mobile 7 needle, at 20 rpm and 25° C.

Another subject of the invention is a method of forming a fastener according to the invention, for assembling at least two structural elements, the method comprising the steps of:

provide a fastener comprising an enlarged head and a cylindrical or tapering smooth shank exhibiting, prior to fitting, an outside diameter greater than an inside diameter of a destination aperture, a locking portion comprising a screw thread or annular grooves exhibiting an outside diameter always smaller than the inside diameter of the destination aperture, and a transition portion between a distal end, with respect to the enlarged head, of said smooth shank and a proximal end, with respect to the enlarged head, of said locking portion, apply a water based composition according to any water-based composition of the invention on an exterior surface of the fastener, positioned on an exterior surface of the smooth shank and or of the locking portion and or of the transition portion, dry the water-based composition such as the water evaporates and forms a sacrificial ring exhibiting, prior to the fitting of the fastener into the structure, an outside diameter greater than a diameter of the aperture with which the smooth shank will interfere after the fastener has been fitted, said sacrificial ring comprising a polymer resin forming a matrix encapsulating dispersant molecules and lubricant molecules.

Oil-based lubricant substance, stored in the sacrificial ring prior to the fitting of the fastener, is thus distributed gradually as the fastener is inserted, on to the contacting walls of the fastener and of the structure or of the sleeve.

The insertion forces are thereby reduced thereby guaranteeing that the fastener can be inserted with acceptable force and preventing the fastener or structure from being damaged.

In one embodiment, the lubricating sacrificial ring is sheared or cut into at least two portions during the fitting step.

In one embodiment, the method comprises a later step of eliminating at least one sacrificial-ring portion.

BRIEF DESCRIPTION OF THE DRAWINGS

The invention and its various applications will be better understood from reading the following description and from studying the accompanying figures. These are given solely by way of indication without in any way limiting the invention. The figures show.

DETAILED DESCRIPTION

In these figures, identical elements retain the same references. In the description which follows, by convention, the term "distal" means "distant from the head of the fastener", and the term "proximal" means "close to the head of the fastener".

In the description, the terms "front" and "rear", except where there is indication or evidence to the contrary, are to be understood in relation to the direction of insertion of a fastener into the aperture in the structure. The rear is therefore on the side of the head of the fastener and the front in the opposite direction.

Figure 4:
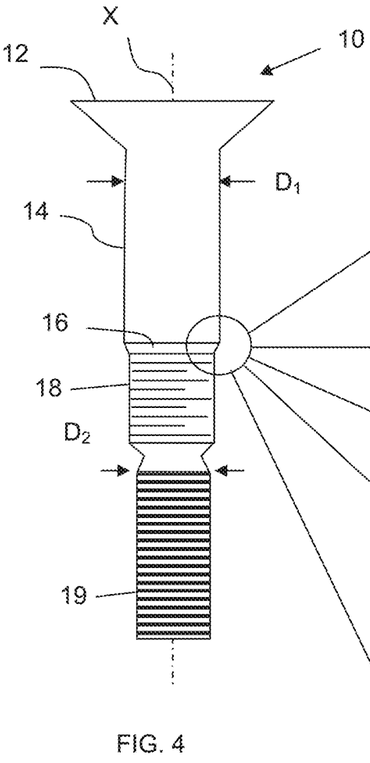
FIG. 4: a fastener seen in side view according to one embodiment of the invention, before being fitted into a structure.

FIG. 4 schematically depicts a side view of a fastener 10 according to one embodiment of the invention.

The fastener 10, substantially of revolution about an axis X of said fastener, comprises a countersunk head 12, a smooth cylindrical shank 14 exhibiting an outside diameter $D_1$ and a locking portion 18, which in the fastener illustrated is threaded, exhibiting an outside diameter $D_2$ measured at the crests of the screw thread, $D_2$ being smaller than $D_1$. A transition portion 16 connects the diameter $D_1$ of the cylindrical shank 14 to the diameter $D_2$ of the threaded locking portion 18. This transition portion may be curved or tapering. The fastener also comprises a pulling stem 19. The fastener 10 is intended to be inserted into a aperture in a structure S, of diameter $D_S$. The diameter $D_S$ is, prior to the fitting of the fastener 10, smaller than the diameter $D_1$ of the smooth shank 14 and greater than the diameter $D_2$ of the threaded portion, so that neither the screw threads nor the structure are damaged as the fastener is introduced into the aperture.

In the example illustrated, the fastener 10 is made of titanium alloy and its exterior surface is fully coated with a layer of coating of the HI-KOTE™ type 1, intended to protect the structure against galvanic corrosion. The fastener could, however, be bare, for example sand-blasted, comprise a thin layer of anodic oxide obtained, for example, by sulfuric anodizing, comprise a layer of aluminum or another coating. The fastener could also comprise coating portions that are annular, in bands parallel to the axis of the fastener, or in the form of a helix, as depicted in the application company's patent FR3008754B1. The fastener 10 furthermore comprises a sacrificial ring 20, 30 (featured in cross section only in FIGS. 4A, 4B, 4C, 4D and 4E) which extend at least over the transition zone 16, namely, at least in part, between a distal end of the shank and a proximal end of the threaded portion (FIGS. 4A, 4B, 4C), over the smooth shank 14 (FIG. 4D) or else over the locking portion 18 (FIG. 4E).

In the embodiments of the inventions, the sacrificial ring has a maximum distance from the axis X of the fastener, representing a maximum outer diameter of the sacrificial ring, even if the sacrificial ring is not precisely circular. The maximum outer diameter of the sacrificial ring is greater than the maximum outer diameter of the screw threads or the annular grooves. In this configuration, the sacrificial ring is first to come into contact with the wall of the aperture/bore. In other words, the sacrificial ring is configured such that it would be considered to have an interference fit with the aperture/bore. Therefore, the screw threads or the annular grooves are configured to have a clearance fit in the aperture/bore, while the sacrificial ring and the exterior surface of the smooth shank are configured to have an interference fit.

The sacrificial ring therefore has a toric shape surrounding the fastener, an axis of the torus being coincident with the axis X of the fastener. A broad definition of the idea of a torus will be considered here insofar as the cross section that generates the volume of the ring is not necessarily a circle and may adopt more or less flattened or deformed shapes, as in the examples illustrated, particularly as a result of the method used to deposit the materials that form the sacrificial ring and as a result of the characteristics they exhibit when being deposited.

According to the embodiments in FIGS. 4A and 4B-4E, the maximum distance of the sacrificial ring from the axis X of the fastener is greater than the outside diameter of the smooth shank portion 14 immediately adjacent to the transition portion 16. Additionally, according to the embodiments in FIGS. 4A, 4C and 4D, the maximum distance of the sacrificial ring from the axis X is greater than the outside diameter of the smooth shank portion immediately adjacent to the sacrificial ring in the proximal direction. In these embodiments, the sacrificial ring contacts the front face at the aperture/bore before or at the same time as the adjacent portion of the smooth shank 14.

Figures 4A, 4B:
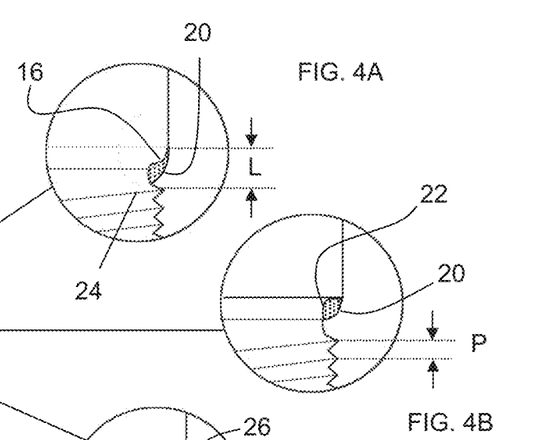
FIGS. 4A, 4B, 4C: details of FIG. 4, according to three embodiments of the invention, comprising a lubricating sacrificial ring in the transition zone, in cross section.
Figures 4C, 4D, 4E:
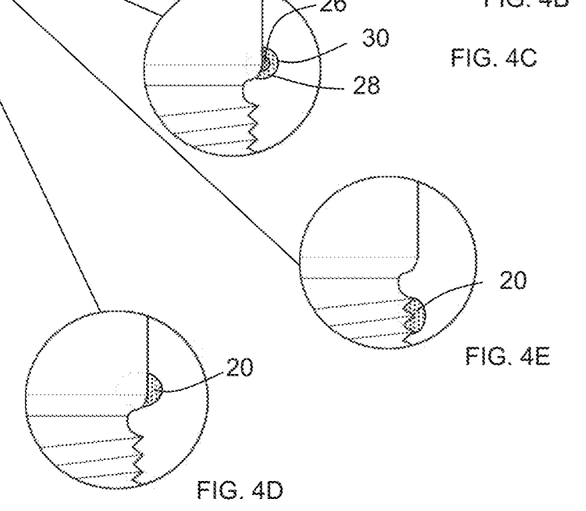
FIG. 4D: detail of FIG. 4, according to one embodiment of the invention, comprising a lubricating sacrificial ring on the smooth shank.
FIG. 4E: detail of FIG. 4, according to one embodiment of the invention, comprising a lubricating sacrificial ring on the locking portion.

According to one embodiment of the invention depicted in FIG. 4A, the ring 20 covers a portion of the fastener over a length L in an axial direction of the fastener, comprising the first thread 24 of the threaded locking portion 18 and the transition zone 16. The ring may also, in this embodiment, extend over part of the smooth shank 14 adjacent to the transition zone (FIG. 4C) and or extend over a part of the locking portion 18, advantageously a part of said smooth shank and or of the locking portion.

According to one embodiment of the invention, depicted in FIG. 4B, the fastener comprises an annular groove 22 in the transition zone 16, characterized by a concave shape of said transition zone in the view in cross section of FIG. 4B. The ring 20 in this example is an annular bead of which an interior surface, situated radially toward the side of the axis X of the fastener, conforms to the shape of the groove, and of which an exterior surface, situated radially on the opposite side to the axis X of the fastener, corresponds to a transition zone intended to be in contact with the wall of the aperture.

One advantage with this embodiment is that it uses the hollow geometry of this groove to mechanically hold the ring on the fastener, with no particular bonding or depositing means. Other shapes of concave profile may be used to create the annular groove 22.

Figure 7:
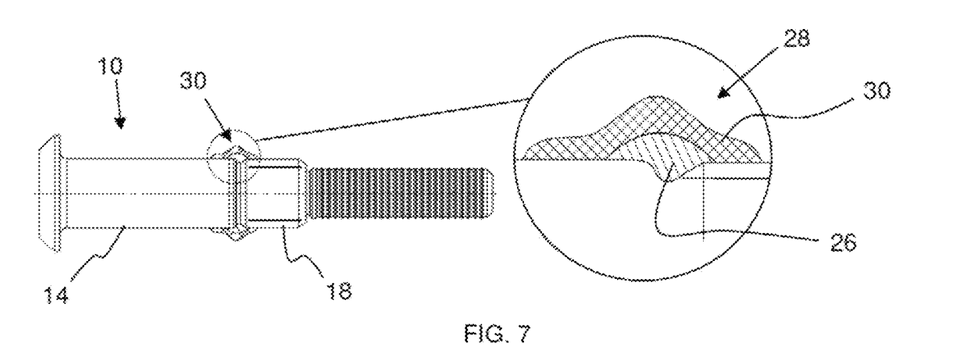
FIG. 7: detail of the structure of a sacrificial ring comprising a lubricating first ring and a solid second ring for protecting the first ring.

According to one embodiment, the sacrificial ring 20 covers part of the smooth shank 14, FIG. 4D. In another embodiment, an exemplary embodiment of which is illustrated in FIG. 7, the sacrificial ring 20 covers part of the smooth shank 14, the transition portion 16, and part of the locking portion 18.

According to one embodiment, the sacrificial ring 20 covers part of the locking portion 18, FIG. 4E.

The sacrificial ring, which is formed with a plane of said ring substantially perpendicular to the axis of the fastener, may be continuous over the periphery of the fastener or may be discontinuous and exhibit peripheral segments following on from one another to form a segmented ring. In this embodiment, the portion of the perimeter covered by the segments is equal to or greater than 50 percent and the spaces separating the segments are small enough that the lubrication afforded by the segments as the fastener is being fitted is distributed substantially uniformly.

Such a result is obtained for example when the spaces separating the ring segments are of a dimension along the perimeter of the fastener that is less than a height of the ring along the longitudinal axis of the fastener.

A lubricating sacrificial ring 20 may be produced from various materials.

The ring for example comprises a lubricating material.

A lubricating material may comprise a fluorinated polymer. For example, the material may comprise 100% polytetrafluoroethylene (referred to as "PTFE"), or a mixture of PTFE and another material having lubricating properties. For example, the ring 20 may comprise 85% PTFE and 15% graphite, or 40% PTFE and 60% bronze, or alternatively a mixture of PTFE and molybdenum disulfide. During insertion into the aperture in a structure, particles of these materials, having lubricating properties, are torn off and contained upstream of the site of the sacrificial ring on the fastener, the transition zone or another location as the case may be, namely in that part of the aperture into which the fastener has already been engaged, between the wall of the aperture and an exterior wall of the fastener.

Another lubricating material suitable for forming the ring 20 is a lubricating polymer, possibly containing lubricating solid particles, such as particles of graphite or particles of cetyl alcohol. During insertion, as with the fluorinated polymer material, lubricating particles are torn off and spread between the wall of the aperture and an exterior wall of the fastener.

The ring is for example obtained by mixing lubricating solid particles into a polymerizable liquid composition and then by applying the composition in the liquid or pasty state and comprising the lubricating particles, to the fastener to form the sacrificial ring. The composition, advantageously placed under conditions favorable to polymerization, for example at a recommended temperature for the polymer used, polymerizes, trapping the solid lubricating particles.

In another embodiment of the invention depicted in FIG. 4C or FIG. 7, a sacrificial ring 30 comprises a lubricating first ring 26 comprising cetyl alcohol and a fatty body, covered by a solid second ring 28 creating a casing of said first ring, which casing is intended to be destroyed during insertion. Of course, the ring 30 may be positioned on the fastener 10 in the embodiments illustrated in FIGS. 4A, 4B, 4D or 4E.

The first ring 26 is obtained for example by dispersing raw crystals of cetyl alcohol in an oil, such as for example a commercially available oil sold under the trade name "biolub" in proportions making it possible to obtain a pasty compound, for example ¾ w/w of cetyl alcohol and ¼ w/w of oil. The compound is applied in the hot state to the cold fastener. In practice, the compound cools in just a few seconds allowing the cetyl alcohol crystals to set. Next, a polymerizable liquid composition is applied to the pasty first ring 26 so as to entirely cover a free surface of said first ring 26 and form a second ring 28 superposed on said first ring. The second ring 28 is then polymerized and/or dried, for example in the open air. The second ring 28 makes it possible to provide containment for the pasty lubricating material of the first ring 26 and, because of its composition and the way in which it is applied to form a layer superposed on the first ring, is naturally destroyed as the fastener 10 is inserted into a aperture. The second ring 28 is, for example, formed with a polymer marketed under the trade name Vibraseal® by the LOCTITE company, or based on a polysulfide polymer known as a sealant mastic in the aeronautical industry under the product name "PR", or even a silicone. A thickness of the second ring 28, resulting from the quantity of the polymerizable liquid composition used to make it, is chosen so that said second ring deforms as the fastener is introduced into the aperture, then ruptures when the ring is compressed in the aperture once the fastener has been inserted into said aperture. The first ring 26 may be produced from other pasty or even waxy lubricating compositions provided that they can be covered with a casing-forming second ring.

The lubricating product used to produce the sacrificial ring may be an oil containing cetylic acid, or a grease.

In the general case of use of an oil, the oil, which may be mineral or synthetic, will be chosen with due consideration to its kinematic viscosity and to its cetylic acid solubility limit.

The wettability and consistency of the oil/cetylic acid mixture, and therefore the possibility of forming a stable lubricating ring on the fastener are dependent on these parameters.

The wettability is dependent on the rheological characteristics of the contacting materials and therefore on the material and surface treatment of the fastener and will advantageously be verified, if not determined, experimentally so as to form a lubricating ring with the desired mechanical and dimensional characteristics.

When a grease is used, its ability to form lubricating ring is connected with the consistency of the grease, for example expressed in terms of its NLGI grade (measured in accordance with standard ASTM D217-6).

A grease with a low NLGI grade corresponding to a grease that is too fluid will not allow the creation of a stable lubricating ring. A grease with a high NLGI grade corresponding to a grease that is too pasty will not be able to be deposited on the fastener satisfactorily.

The grease chosen will advantageously have an NLGI grade of between 00 and 2, or even a grade 3 for greases exhibiting numbers close to grade 3.

The grease used may be a simple product, where applicable containing additives.

The grease may be a mixture of wax with oil, in which mixture the wax, representing between 20 wt % and 50 wt % of the grease, forms a porous matrix trapping the oil.

Preferably, the grease will be selected from greases having a melting point higher than the temperature at which said grease is to be applied to the fastener, for example a melting point of between 25° C. and 250° C.

When the sacrificial ring 30 comprises a second ring 28, the latter forms a physical barrier which protects the lubricant of the first ring 26. Mechanically, the second ring protects the first ring so that there is no loss of lubricating product during the various handlings of the fastener before said fastener is fitted. The second ring also provides a fluidtight barrier which isolates the lubricating product from external agents (oxygen, moisture, contaminants) liable to degrade the quality of the grease.

The material of the second ring also needs to be able to be formed without damaging the first ring, and for that reason preference will be given to a material the hardening of which does not require a heating or does not produce excessive heat, for example a hardening by evaporation of a solvent or by photopolymerization. After hardening, the material of the second ring also needs to maintain sufficient flexibility so that it does not become broken by the handlings of the fastener up to the point at which it is fitted.

As already pointed out, the second ring may be formed by means of a polysulfide-based mastic or a silicone mastic. The second ring may also be formed using sealants often applied in the liquid state and hardening through evaporation of a solvent, such as the sealants used on the screw threads of nuts and bolts used for assembly.

The ring 20 or 30 may be formed on a tool and then slipped on to the fastener if this ring allows handling thereof without damage. The ring 20 or 30 may also be formed by adding lubricating material directly to the fastener, for example by manual or automated depositing of a liquid or pasty composition which polymerizes or dries, by overmolding or by additive manufacture. This ring may be added at various stages in the manufacture of the fastener and possibly undergo grinding or machining operations required for the manufacture of the fastener.

The composition and the shape of the ring, the thickness of the ring 20 or 30 and its position on the fastener are preferably chosen so that the surface of the fastener 10 that is covered by the ring 20, 30 is not the first surface to come into contact with the wall of the aperture during the fitting of the fastener. Typically, the thickness of a ring 20 or 30 in the radial dimension is at least 0.2 mm, which is far higher than the thicknesses of the lubricating thin layers of the prior art which are designed not to become damaged when the fastener is being fitted.

The largest outside diameter of the ring 20, 30 is also chosen to be larger than the smallest diameter of the aperture into which the fastener is fitted, so as also to be an interference fit with all the elements of the structure that are to be assembled. This largest outside diameter of the ring may be equal to or greater than the diameter of the smooth shank 14, provided that it remains greater than the diameter of the aperture which is to be understood here, for complex non-cylindrical aperture s, to mean greater at least than the smallest diameter of the aperture with which the fastener will be an interference fit. For example, in this case of complex aperture, this largest outside diameter of the ring is greater than the largest diameter of the aperture with which the smooth shank will be an interference fit after the fastener has been fitted.

Figure 5:
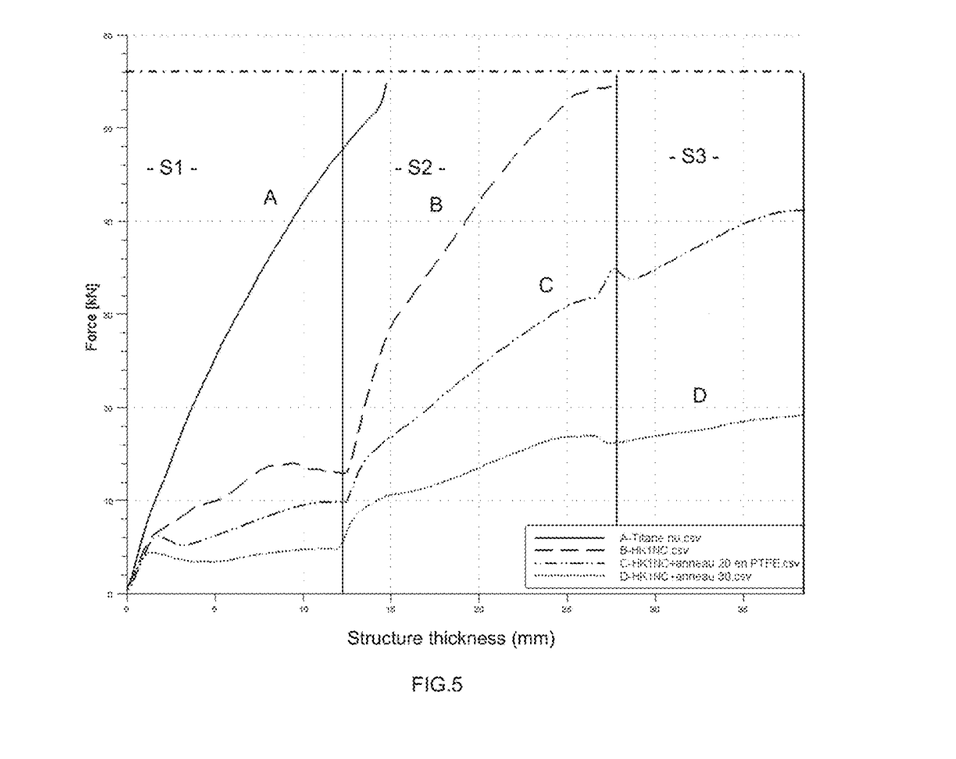
FIGS. 5 and 6: curves of the measured force of fitting fasteners of the prior art and fasteners according to several embodiments of the invention in two multi-layer assemblies.

FIG. 5 shows the results of measuring insertion forces during tests conducted by the applicant company on four fasteners inserted into a structure 38.1 mm thick, comprising three adjacent layers each 12.7 mm thick. The first layer S1 is made of aluminum, the second layer is made of steel and the third layer S3 is made of aluminum. Each fastener has a diameter of ¹⁶⁄₃₂" (12.70 mm), is able to withstand a maximum tensile force of 56 kN and is inserted into a aperture in the structure with a high level of interference of 154 μm.

Fastener A is a bare, uncoated, titanium fastener representing a fastener of the prior art. This fastener barely enters the second layer S2 of the structure and cannot be inserted further, as the maximum insertion force is reached after 15 mm.

Fastener B is a titanium fastener fully coated with HI-KOTE™ 1NC anticorrosion coating, representing a fastener of the prior art, described in patent EP2406336B1. This fastener goes in as far as the second layer S2 of the structure, but cannot be inserted into the third layer of the structure.

Fastener C is a titanium fastener coated with HI-KOTE™ 1NC and provided with a PTFE ring 20 on the transition zone. Fastener C is fully inserted into the structure with an insertion force of around 42 kN.

Fastener D is a titanium fastener coated with HI-KOTE™ 1NC and provided with a ring 30 comprising a ring 26 of cetyl alcohol and oil covered with a second ring 28 of Vibraseal® polymer on the transition zone and part of the smooth shank 14. Fastener D is fully inserted into the structure with an insertion force of around 19 kN.

In cases C or D, the wall of the aperture rubs against the ring 20 or 30 throughout insertion and, because of the nature of the material of the ring, tears off particles of lubricating material (cetyl alcohol or PTFE) which remain trapped between the shank and the wall of the aperture. As the fastener advances through the thickness of the structure, these particles make it possible to maintain low friction forces between the shank and the wall of the aperture. Because of its thickness and composition, the ring 20 or 30 maintains a significant lubricating capability in the transition zone and prevents direct contact between the base material of the fastener and the structure throughout the insertion phase.

The applicant company has discovered during testing that the use of a sacrificial ring could also perform a function of sealing the fastener in the structure. Specifically, as fastener C or D is inserted into the structure, the ring 20 or the second layer 28 of the ring 30 is cut or sheared into two portions at its largest outside diameter. In the case of fastener D, the material of the ring 26 is crushed and retained between the two separate portions of the ring 28. The proximal portion cannot enter the aperture, because of the interference, and remains situated between an exterior surface of the structure and the underside of the head of the fastener. The distal portion is in the aperture and acts as a reserve of lubricant supplied by the ring 26, which is deposited on the walls of the aperture until the threaded portion reemerges from the structure. When the fastener is all the way in, the proximal ring portion is in contact with the underside of the head of the fastener and with the proximal exterior surface of the structure, and the distal ring portion is removed by the threaded portion of the fastener.

In all cases, the sacrificial ring after insertion has an outside diameter smaller than the outside diameter prior to insertion. Depending on the level of interference and depending on the material used, the ring may be simply worn away or cut into at least two portions, pushed back on each side of the transition zone 16. Thus, after insertion, it may prove beneficial to remove the pushed-back portions, or at least the portion pushed back on to the locking portion. In the case of a ring 30, it may be necessary to eliminate the portion of ring 28 pushed back on to the locking portion, and to clean off the pasty lubricating material 26 which will have been pushed back on to the locking zone, under the head, or both, for example using a cloth.

Figure 6:
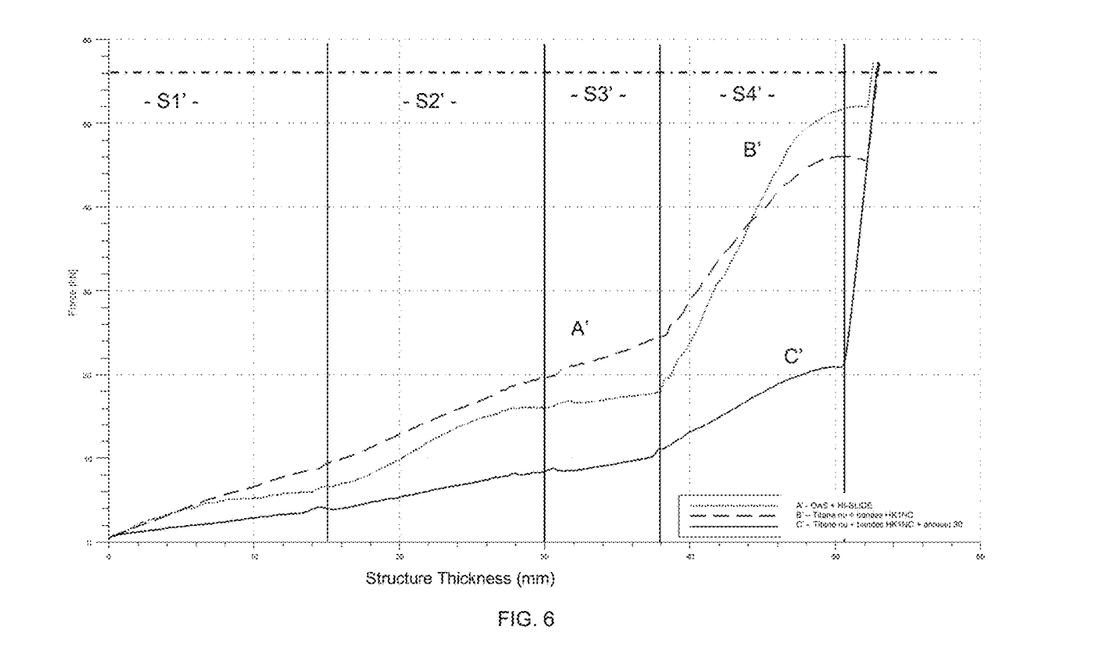

FIG. 6 shows the results of measurements of forces of insertion during tests conducted by the applicant company, relating to three fasteners inserted into an assembly comprising four adjacent layers. The first three layers S1', S2' and S3' are made of composite material, and the fourth layer S4' is made of aluminum. Each fastener A', B' and C' has a diameter of ¹⁶⁄₃₂" (12.70 mm), is able to withstand a maximum tensile force of 56 kN and is inserted into a aperture in the structure with a medium interference of 89 μm.

Fastener A' is a titanium fastener the exterior surface of which has undergone sulfuric anodic oxidation and is covered with a lubricating layer of a HI-SLIDE™ coating comprising a mixture of polyolefin and of polytetrafluoroethylene, representing a fastener of the prior art, described in patent application FR3026446A1. This fastener is fully inserted into the structure with an insertion force of around 52 kN, which is therefore close to the maximum insertion force for fastener A'.

Fastener B' is a bare titanium fastener comprising bands of HI-KOTE™ 1NC anticorrosion coating, representing a fastener of the prior art, described in patent FR3008754B1. This fastener is fully inserted into the structure with an insertion force of around 46 kN.

Fastener C' is a bare titanium fastener comprising bands of HI-KOTE™ 1NC anticorrosion coating described in patent FR3008754B1, and provided with a ring 30, representing a fastener according to one embodiment of the invention. This fastener is fully inserted into the structure with an insertion force of just around 21 kN.

In the test of FIG. 6, the interference is smaller than it was in the previous test and the fasteners are inserted into materials that are "softer" than the materials in the previous test. The fasteners of the prior art thus enter the full thickness of the structure, but with levels of force that are still high, or even very close to the maximum level of force permissible for these fasteners.

It may be noted that, in the curves of FIG. 6, the sharp increase following a gradient that is common to all the tests, on exiting the final layer, corresponds to the pulling of the tooling when the head of the fastener is in contact with the surface so as to achieve deliberate breakage of the pulling stem.

As shown by curves C and D in FIG. 5 and curve C' in FIG. 6, the presence of a lubricating sacrificial ring makes it possible appreciably to reduce the fitting forces for high and medium levels of interference in multi-layered structures as compared with the forces required to fit fasteners of the prior art.

Once the cleaning step, if any, has been performed, a screw or a collar can then be assembled on the locking portion 18 of the fastener to finalize the fitting of the fastener and the assembling of the structure. When the sacrificial ring initially covers an anti-corrosion coating, this ring, sacrificed during fitting, prevents the coating from eroding so that it can then fully perform its anti-corrosion function in contact with the structure, with the nut, or with any other element in contact with the exterior surface of the fastener 10.

The reduction in the force of fitting means that installation is easier for the operators, more lightweight tooling can be used, and the risks of damage to the structure are limited. Maintaining continuous lubrication throughout insertion also prevents the fastener from breaking as it is being inserted into the structure and the complex operations of removing it and of fitting a new fastener.

The invention also makes it possible to fit fasteners as an interference fit in thicker structures, or structures with a higher level of interference, or into structures comprising multiple layers and "hard" materials such as titanium or stainless steel, which have the disadvantage of producing high friction forces.

Of course, the geometry of the fastener is not restricted to that described in the application. A sacrificial ring 20 or 30 may be used on a fastener having, for example, a protruding head rather than a countersunk head, a tapering smooth shank rather than a cylindrical smooth shank, locking grooves instead of a screw thread. It is also possible for the fastener not to comprise a pulling stem, and/or to comprise a sleeve the inside diameter of which is smaller than the outside diameter of the shank of the fastener—whether the fastener be cylindrical or tapering—and the outside diameter of which is smaller than the inside diameter of the aperture prior to the fitting of the fastener in the sleeve.

Such a fastener is, for example, described in the applicant's patent FR 2 946 707.

Moreover, other embodiments of the lubricating sacrificial ring may be envisioned. For example, the ring may comprise a porous matrix structure, the pores of which are filled with liquid, dry or fatty lubricating substance. At the time of insertion, the matrix is worn away and the lubricating substance is released.

Figure 8:
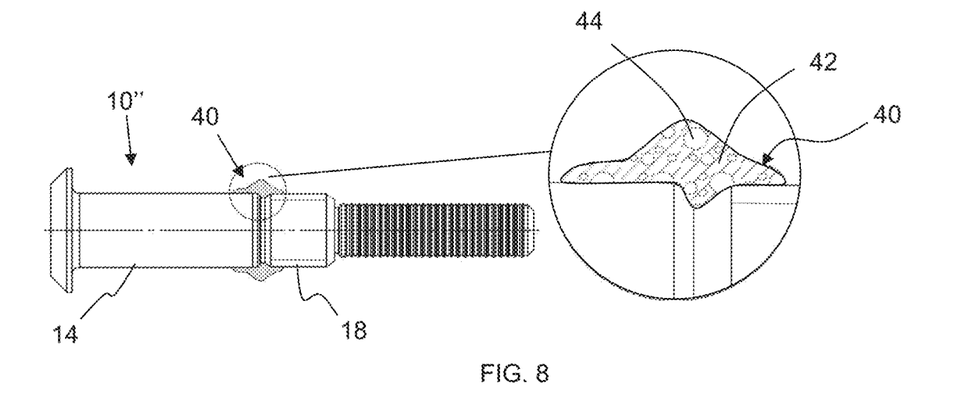
FIG. 8: detail of the structure of a sacrificial ring comprising a matrix structure containing dispersant and lubricant molecules.

A ring 40 having a porous matrix structure is shown in FIG. 8. The ring 40 comprises a dry porous matrix of resin 42 that encapsulates a liquid or pasty oil-based lubricant 44. The dry porous matrix 42 is easily compressed and worn during the interference installation such as to release liquid or pasty lubricant 44 during all the installation. In FIG. 8, the ring 40 is arranged on the smooth shank (14), the transition portion (16) and the locking portion (18) but the ring 40 could be otherwise arranged as the ring 20 shown in FIGS. 4A, 4B, 4D or 4E.

The ring 40 may be for example obtained by mixing a water based resin adapted to form a porous matrix once dried, a water insoluble lubricant comprising oil and a water soluble dispersant, and then by applying the composition in the pasty state to the fastener. The composition placed under conditions favorable to drying, for example at a room temperature, form a tacky ring of a material comprising mainly polymers arranged to form a 3D structure and lubricant stored in a dispersed state encapsulated in the 3D structure, or matrix. The ring material once dry forms a non-layered material in which very fine lubricant nodules are embedded.

A preferred water based resin adapted to form a porous matrix has, in the liquid state, a viscosity between 20 000 and 50 000 Cp, measured with a RVT Brookfield viscometer, with a Mobile 7 needle, at 20 rpm and 25° C. Above 50 000 Cp, the composition comprising the resin may be too visquous and may form a very large bead on the fastener. Below 20 000 Cp, the composition comprising the resin may be too liquid and would be hard to apply on the fastener as it would flow around the fastener surface and could not form a pasty ring.

A suitable water based resin adapted to form a porous matrix once dried is an acrylic polymer sealant, such as LOCTITE® Vibra-Seal 503 sealant or LOCTITE® Vibra-Seal 516 sealant used as thread sealants for bulk processing applications.

Another suitable water based resin adapted to form a porous matrix once dried is TecSeal® 516 manufactured by Tectorius. Another suitable water based resin adapted to form a porous matrix once dried comprises epoxy polymer resin.

A preferred water insoluble lubricant has a viscosity between 10 and 100 Cst, to allow a good release of the lubricant from the porous matrix.

A suitable water insoluble lubricant is a synthetic oil lubricant, such as BOELUBE® 70106, manufactured by the The Orelube Corporation of Plainview, N.Y. 11803, used as a machining lubricant.

Another suitable water insoluble lubricant is a mineral oil, such as AeroShell Turbine Oil manufactured by Shell.

A preferred water insoluble lubricant comprises at least 80% in weight of oil in the total composition of the water insoluble lubricant.

The water insoluble lubricant may also comprise a combination of a first water insoluble lubricant and a second water insoluble lubricant. In an example, the first lubricant is a synthetic or a mineral oil, and the second lubricant is cetyl alcohol.

A dispersant contains molecules with a hydrophobic group—usually a long hydrocarbon chain, which is lipophilic and attracted by grease or oil—and a hydrophilic group—usually a ionic end, attracted by water. Typically, when a dispersant is added to a two-phases mixture of water and oil, the hydrophilic group orients itself toward the oil molecules, whereas the ionic end orients itself towards the water molecule. If enough dispersant is added to the mixture of oil and water, the dispersant disperses the oil into micro drops into the water, the dispersant molecules forming like a shell around the oil molecules, such as the two-phases oil and water seem to form only one phase. Dispersants are commonly used to emulsify oil-based component in water, for instance to clean and control oil spills in the ocean.

The applicant imagined to add such dispersant to a mixture of water based resin adapted to form a porous matrix once dried, and a water insoluble lubricant, such as the dispersant disperses such lubricant into micro drops into the water based resin, and forms a shell of dispersant molecules around the micro lubricant drops. Once the composition has been applied on the fastener, the water evaporates during the drying step. The remainder resin molecules form a matrix structure encapsulating the micro lubricant drops surrounded by the dispersant molecules.

A first preferred water-based composition may comprise:
  20% to 60% by volume of water based resin,
  35% to 75% by volume of water insoluble oil-based lubricant, and
  1% to 10% by volume of dispersant.

A second preferred water-based composition may comprise:
  25% to 50% by volume of water based resin,
  45% to 70% by volume of water insoluble oil-based lubricant, and
  4% to 6% by volume of dispersant.

Whereas the exact amount of each component would depend of several parameters such as amount of water in the water based resin, or ratio and/or purity of oil in the water insoluble lubricant, the applicant discovered several points regarding the proportions of each component.

If the amount of water based resin is too low in the composition, the resin may not be able to form a matrix, and the composition may be too pasty or too liquid, and may not able to dry enough to form a tacky ring.

On the contrary, if the amount of water based resin is too high, the ring may be mainly a resin matrix encapsulating few amounts of lubricant, and may not be able to release enough comprising lubricant during the fastener insertion into structures.

If the amount of water insoluble lubricant is too low, the ring may be too dry and may not be able to allow the fastener insertion.

On the contrary, if the amount of water insoluble lubricant is too high, the ring may be solidified at the time the liquid composition is applied on the fastener, but the lubricant may leaks from the resin matrix with time, for instance during storage of the fastener.

The amount of lubricant should not be too low compared to the water content of the composition, or it could lead to the formation of lubricant lumps, instead of very small drops of lubricant.

In another embodiment, a third water-based composition may comprise:
- 10% to 60% by volume of water based resin,
- 2.5% to 20% by volume of cetyl alcohol,
- 35% to 70% by volume of water insoluble oil-based lubricant, and
- 1% to 10% by volume of dispersant.

As the cetyl alcohol is solid at room temperature, it may be added in the water based lubricant in the solid state and the mixture may be heated, for instance between 35° C. and 60° C., in order the mixture is added in a liquid state to the water based resin.

A fourth preferred water-based composition may comprise:
- 25% to 45% by volume of water based resin,
- 2.5% to 10% by volume of cetyl alcohol,
- 45% to 70% by volume of water insoluble oil-based lubricant, and
- 5% to 10% by volume of dispersant.

Figure 9:
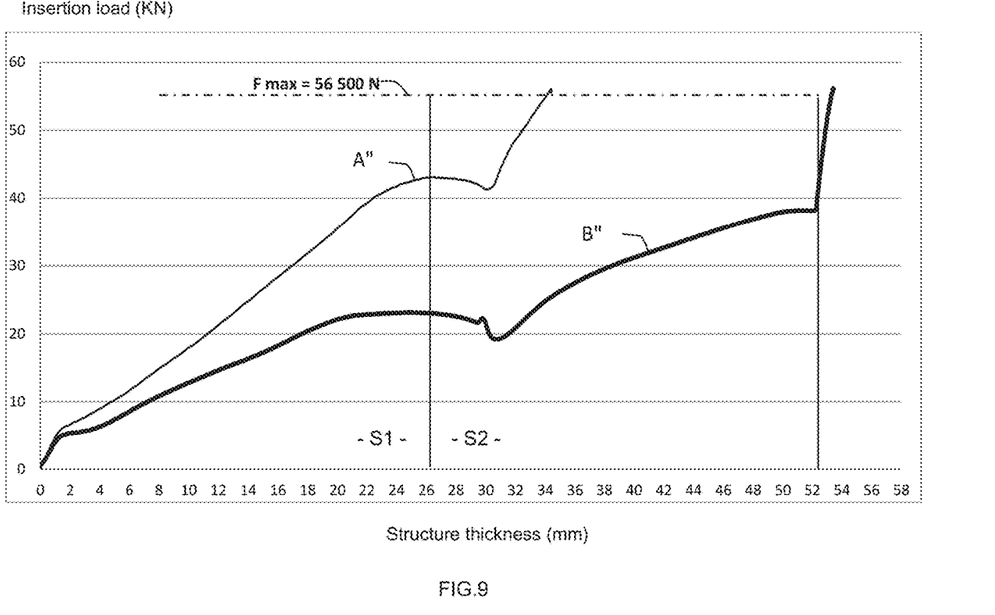
FIGS. 9, 10 and 11: curves of the measured force of fitting fasteners of the prior art and fasteners according to other embodiments of the invention in two-layer assemblies.
Figure 10:
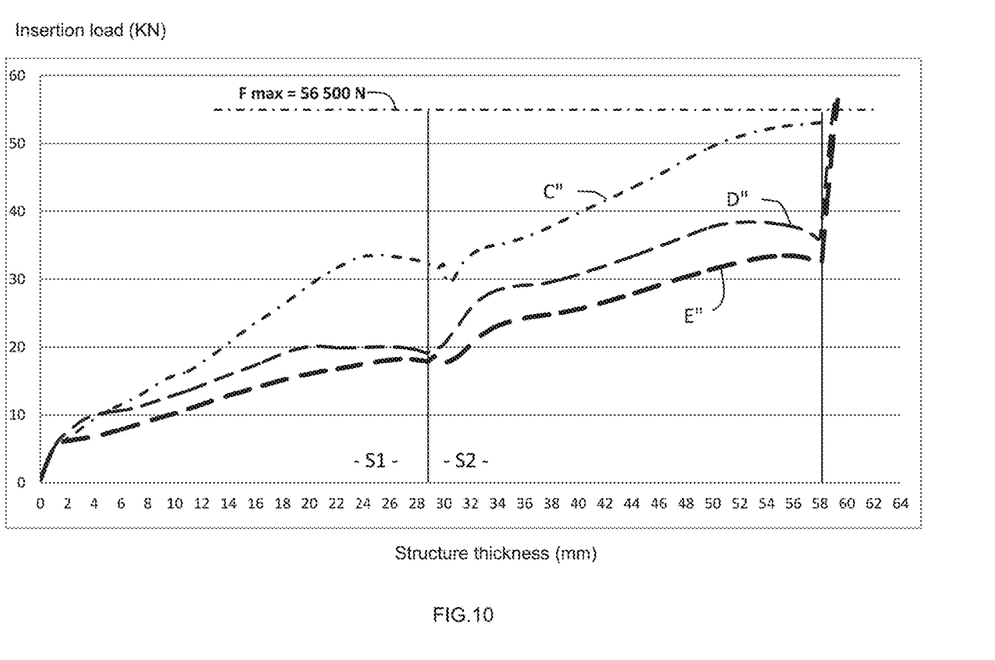
Figure 11:
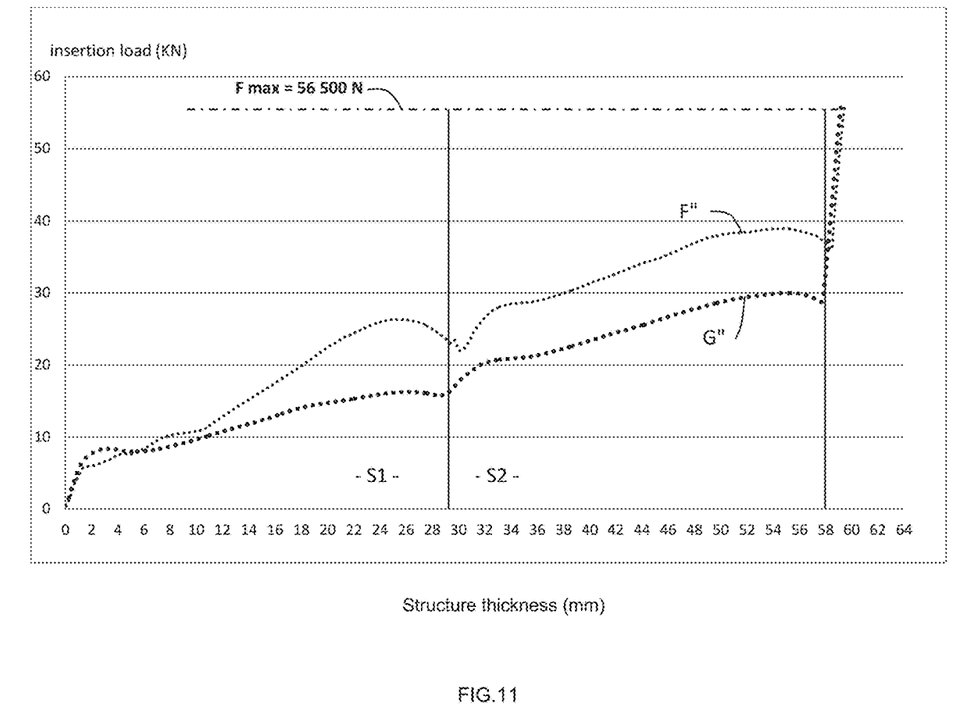

FIGS. 9 to 11 show the results of measuring insertion forces during tests conducted by the applicant company on fasteners of prior art and fasteners 10" of FIG. 8 with different finish configurations inserted into a structure comprising two adjacent layers S1, S2 made of aluminum. Each fastener 10" has a diameter of 16/32 inches (12.70 mm), is able to withstand a maximum tensile force of 56.5 kN and is inserted into a aperture in the structure with a high level of interference greater than 130 µm, which is considered as a high interference fit level.

Fastener A" of FIG. 9 is a bare, uncoated, titanium fastener representing a fastener of the prior art. This fastener barely enters the second layer S2 of the structure and cannot be inserted further, as the maximum insertion force is reached after 34 mm in the structure.

Fastener B" of FIG. 9 is a bare, uncoated, titanium fastener comprising a ring 40 as depicted in FIG. 8, the ring comprising a mixture of synthetic oil, cetyl alcohol, dispersant and acrylic polymer. Fastener B" is fully inserted into the structure with an insertion force of around 38 kN.

Fastener C" of FIG. 10 is a titanium fastener coated with HI-KOTE™ 1NC stripes, representing a fastener of the prior art. Fastener C" is fully inserted into the two layers of the structure with an insertion force of around 53 kN.

Fastener D" of FIG. 10 is a titanium fastener coated with HI-KOTE™ 1NC stripes and provided with a ring 40 as depicted in FIG. 8, the ring comprising a mixture of synthetic oil, dispersant and acrylic polymer. Fastener D" is fully inserted into the structure with an insertion force of around 39 kN.

Fastener E" of FIG. 10 is a titanium fastener coated with HI-KOTE™ 1NC stripes and provided with a ring 40 as depicted in FIG. 8, the ring comprising a mixture of synthetic oil, cetyl alcohol, dispersant and acrylic polymer. Fastener E" is fully inserted into the structure with an insertion force of around 34 kN.

Fastener F" of FIG. 11 is a titanium fastener fully coated with HI-KOTE™ 1NC anticorrosion coating dipped into cetyl alcohol, representing a fastener of the prior art. This fastener is inserted in the structure with an insertion load of 39 kN.

Fastener G" of FIG. 11 is a titanium fastener fully coated with HI-KOTE™ 1NC anticorrosion coating, provided with a ring 40 as depicted in FIG. 8, the ring comprising a mixture of synthetic oil, cetyl alcohol, dispersant and acrylic polymer. Fastener G" is fully inserted into the structure with an insertion force of around 30 kN.

In cases of fasteners B", D", E" or G", the wall of the aperture rubs against the ring 40 throughout insertion and, because of the nature of the material of the ring, compresses itself and releases liquid or pasty drops of oil, or oil and grease, which remain trapped between the shank and the wall of the aperture. As the fastener B", D", E" or G" advances through the thickness of the structure, these drops make it possible to maintain low friction forces between the shank and the wall of the aperture. Because of its composition, the ring 40 maintains a significant lubricating capability in the transition zone and prevents direct contact between the base material of the fastener and the structure throughout the insertion phase.

In all cases, the sacrificial ring after insertion has an outside diameter smaller than the outside diameter prior to insertion. Depending on the level of interference and depending on the material used, the ring may be simply worn away or cut into at least two portions, pushed back on each side of the transition zone 16. Thus, after insertion, it may prove beneficial to remove the pushed-back portions, or at least the portion pushed back on to the locking portion and to clean off the pasty lubricating material which will have been pushed back on to the locking zone, under the head, or both, for example using a cloth.

As shown by the tests, the invention makes it possible to fit fasteners as interference fit in thicker structures, or structures with a higher level of interference, or into structures comprising multiple layers and "hard" materials such as titanium or stainless steel, which have the disadvantage of producing high friction forces.

The invention also makes it possible to omit the lubricating or anti-corrosion coating on the shank of the screw and/or on the inside of the sleeve, in the case of a sleeved fastener. Omitting the coating makes it possible to improve the electrical conductivity between the shank of the screw and the wall of the sleeve or of the structure, notably to pass lightning current when lightning strikes a fastener or a structure of an aircraft.

The invention is also a less expensive alternative to fully or partially coated fasteners, which manufacture is longer than uncoated fasteners and may require specific technologies or skills to meet very fine tolerances on coating thickness, positions and dimensions.

In another example, the sacrificial ring may comprise fatty or pasty lubricating particles microencapsulated and deposited in one or more layers, and a binder allowing the microcapsules to be held in position on the fastener to constitute the sacrificial ring. During insertion, the microcapsules are burst and the lubricant is released.

In another example, the sacrificial ring may comprise a lubricating coating designed to undergo abrasion, comprising a matrix and lubricating particles trapped in the matrix. This type of coating is used for example in the field of turbomachines, to create seals subjected to abrasion in use.

One and the same fastener may also comprise a plurality of sacrificial rings.

The invention claimed is:

1. A fastener for assembling at least two structural elements, the fastener comprising an enlarged head and a cylindrical or tapering smooth shank exhibiting, prior to fitting, an outside diameter ($D_1$) greater than an inside diameter ($D_S$) of a destination aperture, a locking portion comprising a screw thread or annular grooves exhibiting an outside diameter always smaller than the inside diameter ($D_S$) of the destination aperture, and a transition portion between a distal end, with respect to the enlarged head, of said smooth shank and a proximal end, with respect to the enlarged head, of said locking portion, wherein said fastener comprises at least one sacrificial ring containing a lubricant, arranged on at least one of an exterior surface of the fastener, positioned on an exterior surface of the smooth shank and of the locking portion and of the transition portion, said sacrificial ring exhibiting, prior to introducing the fastener into the structure, an outside diameter greater than a maximum outside diameter of the locking portion and greater than a smallest diameter of the aperture with which the smooth shank will interfere after the fastener has been fitted, and wherein the sacrificial ring exhibits, prior to introducing the fastener into the structure, a toroidal shape, and wherein the sacrificial ring is configured so that it is first to come into contact with a wall of the aperture when the fastener is introduced into the structure.

2. The fastener as claimed in claim 1 in which the sacrificial ring exhibits, prior to introducing the fastener into the structure, an outside diameter greater than a largest diameter of the aperture with which the smooth shank will interfere after the fastener has been fitted.

3. The fastener as claimed in claim 1, in which the sacrificial ring exhibits, after the fastener has been introduced into the structure, an outside diameter smaller than the outside diameter it had prior to being introduced.

4. The fastener as claimed in claim 1, in which the sacrificial ring is sheared or cut into at least two portions after the fastener has been introduced into the structure.

5. The fastener as claimed in claim 4, in which a sheared or cut portion of the sacrificial ring is positioned between an exterior surface of the structure and a surface of the head of the fastener after the fastener has been fitted into the structure.

6. The fastener as claimed in claim 1, in which the sacrificial ring is worn during the fitting of the fastener into the structure.

7. The fastener as claimed in claim 1 wherein said sacrificial ring comprises a polymer resin forming a matrix encapsulating dispersant molecules and lubricant molecules.

8. The fastener as claimed in claim 7, in which the lubricant comprises a synthetic or mineral oil containing at least 80% by volume of oil.

9. The fastener as claimed in claim 7 in which the lubricant comprises a mixture of synthetic or mineral oil and cetyl alcohol.

10. The fastener as claimed in claim 7 in which dispersant molecules surround the lubricant molecules.

11. The fastener as claimed in claim 7, in which the polymer resin comprises acrylic polymer.

12. The fastener as claimed in claim 1, comprising a circular groove formed so that it is recessed with respect to an exterior surface of the smooth shank, in said smooth shank or in the region of the transition portion, and in which circular groove the sacrificial ring is positioned, said sacrificial ring having a shape that complements said circular groove so as to ensure retention of the sacrificial ring in the circular groove.

13. The fastener as claimed in claim 1, in which the sacrificial ring comprises polytetrafluoroethylene.

14. The fastener as claimed in claim 13, in which the sacrificial ring further comprises at least one of graphite and bronze.

15. The fastener as claimed in claim 1, in which the sacrificial ring comprises a lubricating polymer.

16. The fastener as claimed in claim 15, in which the sacrificial ring further comprises at least one of dry particles of graphite and of cetyl alcohol.

17. The fastener as claimed in claim 1, in which the sacrificial ring comprises a first ring comprising a pasty lubricant covered by a second ring forming a sacrificial solid casing.

18. The fastener as claimed in claim 17, in which the pasty lubricant comprises cetyl alcohol and an oil.

19. The fastener as claimed in claim 18, in which the pasty lubricant comprises a grease with an NLGI grade of between 00 and 3.

20. The fastener as claimed in claim 19, in which the grease comprises a mixture of wax and of oil, the wax representing between 20% and 50% by weight of the grease.

21. The fastener as claimed in claim 17, in which the second ring comprises an acrylic polymer, a silicone or a polysulfide polymer.

22. The fastener as claimed in claim 17 in which the second ring is a fluid-tight film resulting from an application of a liquid sealant, hardened by evaporation in the air.

23. The fastener as claimed in claim 1, in which the sacrificial ring is discontinuous and exhibits peripheral segments following on from one another to form a segmented ring.

24. A method of assembly for assembling at least two structural elements comprising an aperture exhibiting, before fitting, an inside diameter ($D_S$), the method comprising the steps of
supplying a fastener according to claim 1,
forcibly fitting the fastener into the aperture or into a sleeve placed in the aperture, during which step the lubricating sacrificial ring is worn through interference with an interior wall of the aperture or of the sleeve, so as to release a lubricating substance between a distal end of the smooth shank and a proximal end of said smooth shank.

25. The assembly method as claimed in claim 24, in which the lubricating sacrificial ring is sheared or cut into at least two portions during the fitting step.

* * * * *